US011095571B2

(12) United States Patent
Armstrong et al.

(10) Patent No.: US 11,095,571 B2
(45) Date of Patent: *Aug. 17, 2021

(54) FLEXIBLE AND SCALABLE ENHANCED TRANSMISSION SELECTION METHOD FOR NETWORK FABRICS

(71) Applicant: International Business Machines Corporation, Armonk, NY (US)

(72) Inventors: William J. Armstrong, Rochester, MN (US); Claude Basso, Nice (FR); Chih-Jen Chang, Apex, NC (US); Mircea Gusat, Langnau a.A. (CH); Cyriel J. Minkenberg, Gutenswil (CH); Fredy D. Neeser, Langnau a.A. (CH); Kenneth M. Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 353 days.

This patent is subject to a terminal disclaimer.

(21) Appl. No.: 15/802,087

(22) Filed: Nov. 2, 2017

(65) Prior Publication Data

US 2018/0145926 A1    May 24, 2018

Related U.S. Application Data

(63) Continuation of application No. 13/693,096, filed on Dec. 4, 2012, now Pat. No. 9,621,479, which is a
(Continued)

(51) Int. Cl.
*H04L 12/927* (2013.01)
*H04L 12/46* (2006.01)
(Continued)

(52) U.S. Cl.
CPC ............ *H04L 47/78* (2013.01); *H04L 12/465* (2013.01)

(58) Field of Classification Search
CPC ... H04L 47/78; H04L 12/465; H04L 41/0896; H04L 49/354; H04L 47/80; H04L 47/805
See application file for complete search history.

(56) References Cited

U.S. PATENT DOCUMENTS 7,936,770 B1 *   5/2011   Frattura .................. H04L 49/90
                                                                  370/412
8,392,571 B2     3/2013   Schlansker et al.
(Continued)

FOREIGN PATENT DOCUMENTS

CN           1764180 A      4/2006
CN         101030917 A      9/2007
(Continued)

*Primary Examiner* — Diane L Lo
*Assistant Examiner* — Abusayeed M Haque
(74) *Attorney, Agent, or Firm* — Patterson + Sheridan, LLP

(57) ABSTRACT

IEEE 802.1Q and Enhanced Transmission Selection provide only eight different traffic classes that may be used to control bandwidth in a particular physical connection (or link). Instead of relying only on these eight traffic classes to manage bandwidth, the embodiments discussed herein disclose using an Enhanced Transmission Selection scheduler that permits a network device to set the bandwidth for an individual virtual LAN. Allocating bandwidth in a port based on a virtual LAN ID permits a network device to allocate bandwidth to, e.g., millions of unique virtual LANs. Thus, this technique may increase the granular control of the network fabric and its performance.

21 Claims, 8 Drawing Sheets

Related U.S. Application Data continuation of application No. 13/334,306, filed on Dec. 22, 2011, now Pat. No. 9,860,188.

(51) Int. Cl.
*H04L 12/931* (2013.01)
*H04L 12/911* (2013.01)

(56) References Cited

U.S. PATENT DOCUMENTS

| | | | |
|---|---|---|---|
| 9,621,479 B2 | 4/2017 | Armstrong et al. | |
| 9,860,188 B2* | 1/2018 | Armstrong | H04L 12/465 |
| 2002/0031142 A1 | 3/2002 | Metin et al. | |
| 2002/0110087 A1 | 8/2002 | Zelig et al. | |
| 2003/0212908 A1* | 11/2003 | Piesco | H04L 41/08 |
| | | | 726/25 |
| 2003/0223414 A1 | 12/2003 | Wong | |
| 2004/0100923 A1* | 5/2004 | Yam | H04W 36/14 |
| | | | 370/328 |
| 2005/0157721 A1 | 7/2005 | Rabie et al. | |
| 2005/0160180 A1* | 7/2005 | Rabje | H04L 47/2441 |
| | | | 709/238 |
| 2005/0177644 A1* | 8/2005 | Basso | H04L 49/90 |
| | | | 709/232 |
| 2005/0271084 A1 | 12/2005 | Bruckman et al. | |
| 2007/0061433 A1* | 3/2007 | Reynolds | H04L 47/20 |
| | | | 709/223 |
| 2007/0110028 A1* | 5/2007 | Wu | H04L 12/4666 |
| | | | 370/352 |
| 2007/0171917 A1 | 7/2007 | Dai | |
| 2008/0317039 A1* | 12/2008 | Satterlee | H04L 12/66 |
| | | | 370/395.5 |
| 2008/0317070 A1 | 12/2008 | Propp et al. | |
| 2009/0064268 A1* | 3/2009 | Straub | H04L 12/2803 |
| | | | 725/152 |
| 2009/0067437 A1* | 3/2009 | Krishnan | H04L 12/2856 |
| | | | 370/395.53 |
| 2009/0141731 A1* | 6/2009 | Bitar | H04L 45/245 |
| | | | 370/412 |
| 2009/0162064 A1* | 6/2009 | Mizutani | H04J 14/0247 |
| | | | 398/66 |
| 2009/0279552 A1 | 11/2009 | Dong | |
| 2009/0316705 A1* | 12/2009 | Zhao | H04L 47/824 |
| | | | 370/395.53 |
| 2010/0246393 A1 | 9/2010 | Chamas et al. | |
| 2010/0260188 A1 | 10/2010 | Zhou | |
| 2010/0303075 A1 | 12/2010 | Tripathi et al. | |
| 2011/0029734 A1 | 2/2011 | Pope et al. | |
| 2011/0051723 A1* | 3/2011 | Rabie | H04L 47/10 |
| | | | 370/389 |
| 2011/0069711 A1* | 3/2011 | Jha | H04L 12/4625 |
| | | | 370/395.53 |
| 2011/0110248 A1 | 5/2011 | Koitabashi et al. | |
| 2011/0115468 A1 | 5/2011 | Kantake et al. | |
| 2011/0200046 A1* | 8/2011 | Kojima | H04L 49/351 |
| | | | 370/392 |
| 2011/0270987 A1* | 11/2011 | Schlansker | H04L 45/02 |
| | | | 709/226 |
| 2011/0299414 A1* | 12/2011 | Yu | H04L 45/66 |
| | | | 370/252 |
| 2011/0305455 A1* | 12/2011 | Helleberg Andersen | |
| | | | H04J 14/00 |
| | | | 398/41 |
| 2012/0127857 A1* | 5/2012 | Sundar | H04L 47/12 |
| | | | 370/230.1 |
| 2012/0307631 A1* | 12/2012 | Yang | H04L 43/0876 |
| | | | 370/230 |
| 2013/0136091 A1* | 5/2013 | Ludwig | H04W 72/10 |
| | | | 370/329 |
| 2013/0163611 A1 | 6/2013 | Armstrong et al. | |
| 2013/0346583 A1* | 12/2013 | Low | H04L 12/4641 |
| | | | 709/223 |
| 2014/0119377 A1* | 5/2014 | Crosta | H04L 45/7453 |
| | | | 370/392 |
| 2015/0055131 A1 | 2/2015 | Ono et al. | |

FOREIGN PATENT DOCUMENTS

| | | |
|---|---|---|
| JP | 2010004310 A | 1/2010 |
| WO | 2011156256 A1 | 12/2011 |

* cited by examiner

FLEXIBLE AND SCALABLE ENHANCED TRANSMISSION SELECTION METHOD FOR NETWORK FABRICS

CROSS-REFERENCE TO RELATED APPLICATION

This application is a continuation of U.S. patent application Ser. No. 13/693,096, filed Dec. 4, 2012 (now U.S. Pat. No. 9,621,479), which is a continuation of U.S. patent application Ser. No. 13/334,306, filed Dec. 22, 2011. The aforementioned related patent applications are herein incorporated by reference in their entirety.

BACKGROUND

Field of the Invention

The present invention generally relates to assigning bandwidth in a network fabric, or, more specifically, to assigning bandwidth to specific, logical data flows within the network fabric.

Description of Related Art

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

A plurality of switches may be combined to create one logical switch. In addition, each physical connection between the plurality of switches and the servers may be managed such that specific data flows in the connection are assigned a minimum amount of bandwidth. That is, one data flow in the physical connection may be assigned more bandwidth than another. Increasing the ability of a system administrator to assign bandwidth to specific data flows also increases the system administrator's control of the network.

SUMMARY

Embodiments of the invention disclose a method and computer-readable storage medium that provide a physical connection that connects two computing devices where network traffic flowing through the physical connection is logically divided into a plurality of virtual local area networks (VLAN) channels. The method and computer-readable storage medium allocate a bandwidth of the physical connection amongst at least two of the plurality of VLAN channels and subdivide the bandwidth allocated to one of the plurality of VLAN channels amongst a plurality of traffic classes.

In another embodiment, a network device comprises a port configured to be connected via a physical connection to a computing device, wherein network traffic flowing through the physical connection is logically divided into a plurality of virtual local area networks (VLAN) channels. The network device also comprises a bandwidth scheduler configured to allocate a bandwidth of the port amongst at least two of the plurality of VLAN channels and subdivide the bandwidth allocated to one of the plurality of VLAN channels amongst a plurality of traffic classes.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
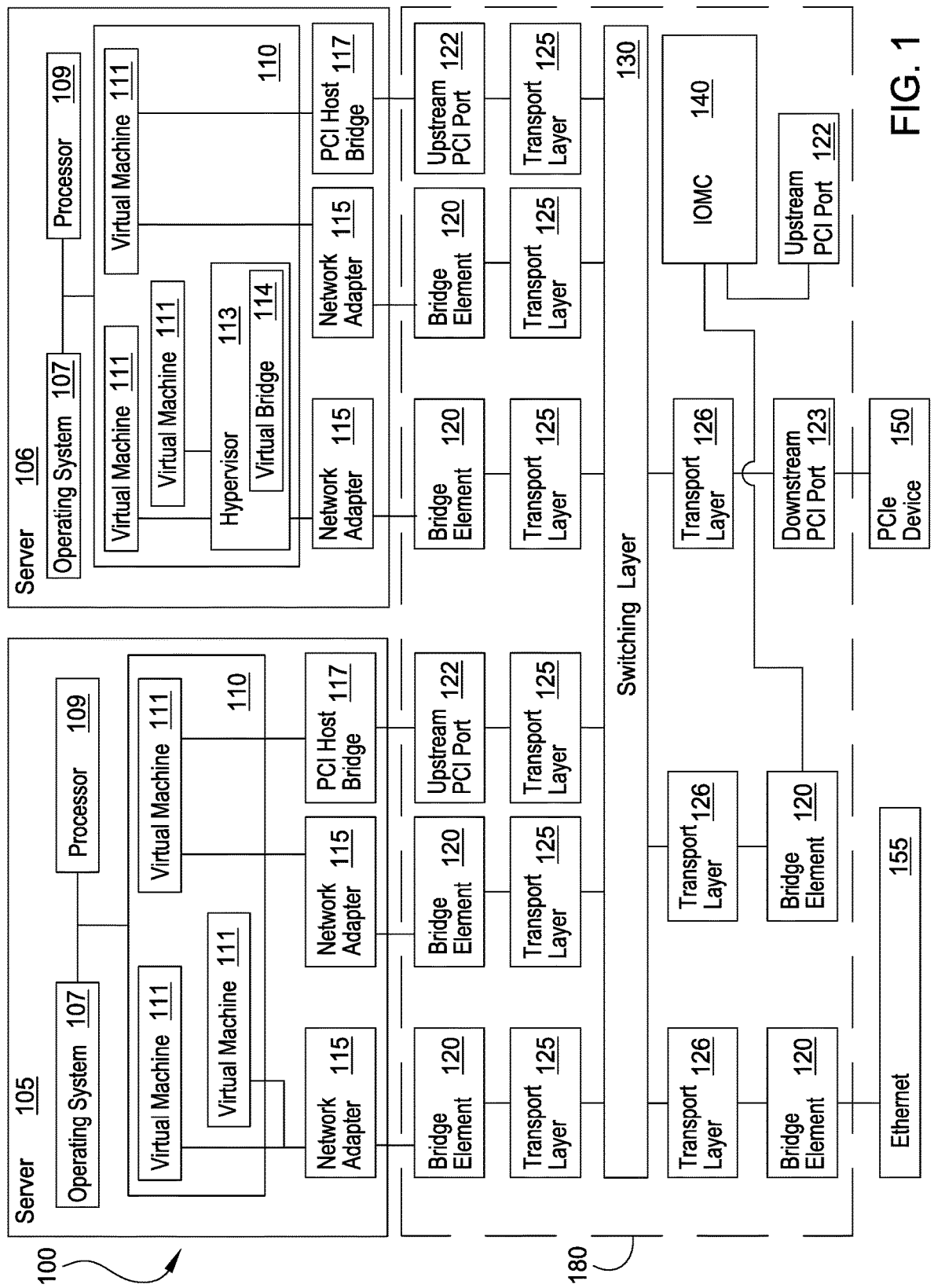
FIG. 1 illustrates a system architecture that includes a distributed virtual switch, according to one embodiment of the invention.

IEEE 802.1Q (or 802.1p) permits the data flow on one physical connection to be logically divided into eight different priorities or traffic classes. The standard also provides a technique for splitting the total bandwidth of the physical connection between the eight traffic classes. For example, an administrator can set the minimum bandwidth that must be provided to a given traffic class. To provide additional flexibility, IEEE 802.1Qaz (hereinafter referred to as Enhanced Transmission Selection (ETS)) provides a standard for reallocating bandwidth between traffic classes. When the network traffic assigned to a traffic class does not use its allocated bandwidth, ETS permits other traffic classes to use the available bandwidth. ETS can even coexist with strict priorities—i.e., bandwidth for certain traffic classes cannot be shared. If the bandwidth for two traffic classes is not a strict priority, then ETS allows the unused bandwidth of one traffic class to be used by the other. For example, if the data flows associated with two traffic classes are bursty—i.e., experience short periods of high loads—so long as the high loads do not occur simultaneously, the traffic class currently experiencing the high loads can use some or all of the bandwidth assigned to the other traffic class. If the high loads occur simultaneously such that the traffic classes use all of the allotted bandwidth, then ETS does not allow one traffic class to borrow bandwidth from the other.

IEEE 802.1Q also standardized the use of virtual local area networks (VLAN) in converged enhanced Ethernet (CEE) networks. In general, VLANs permit the end stations of a physical LAN to be grouped together even if the end stations of the LAN are not located on the same network switch. That is, two physical connections associated with two different switches may be logically connected to be part of the same LAN (i.e., a VLAN). Packets include a VLAN ID (i.e., VLAN tag) which assigns the packets to a particular VLAN. VLANs provide the segmentation services traditionally provided by routers and increase the scalability, security, and network management of a LAN.

IEEE 802.1Q provides 12 bits for identifying a service VLAN (S-VLAN)—i.e., 4096 uniquely addressable S-VLANs. Later routing standards added that each S-VLAN may have a plurality of associated customer VLANs (C-VLANs). In IEEE 802.1QinQ, for example, each S-VLAN can be associated with up to 4096 C-VLANs. A LAN following this standard may have up to 16,777,216 VLANs ($2^{12}*2^{12}$). However, IEEE 802.1Q and ETS provide only eight different traffic classes that may be used to control bandwidth in a particular physical connection (or link). Instead of relying only on these eight traffic classes to manage bandwidth, the embodiments discussed herein disclose using an enhanced ETS scheduler to allocate the bandwidth of a physical connection to individual VLANs. Using VLAN IDs instead of relying solely on traffic classes permit a network device to allocate bandwidth to, e.g., millions of unique VLANs. Thus, the use of the VLAN ID may increase the granular control of the network fabric and its performance.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

FIG. 1 illustrates a system architecture that includes a virtual switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the virtual switch 180. The data is then routed via the switching layer 130 to the correct downstream PCI port 123 which may be located on the same or different switch module as the upstream PCI port 122. The data may then be forwarded to the PCI device 150. As used herein, "virtual switch" is used to describe the plurality of distributed hardware switch elements that are interconnected to appear to a device connecting to one of the switch element to be one single switch.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed virtual switch 180.

The distributed virtual switch 180, in general, includes a plurality of bridge elements 120 that may be located on a plurality of a separate, though interconnected, hardware components. To the perspective of the network adapters 115, the virtual switch 180 acts like one single switch even though the switch 180 may be composed of multiple switches that are physically located on different components. Distributing the switch 180 provides redundancy in case of failure and scales to interconnect more servers in a more cost-effective manner relative to a single large switch.

Each of the bridge elements 120 may be connected to one or more transport layer modules 125 that translate received data frames to the protocol used by the switching layer 130. For example, the transport layer modules 125 may translate data received using either an Ethernet or PCI communication method to packets having a generic format (i.e., cells) that are transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer payloads of different protocols on the same switching layer 130.

Although not shown in FIG. 1, in one embodiment, the switching layer 130 may comprise a local rack interconnect which connects bridge elements 120 located within the same chassis and rack, as well as links that connect to bridge elements 120 in other chassis and racks.

After routing the cells, the switching layer 130 may communicate with transport layer modules 126 that translate the cells back to data frames or messages that correspond to appropriate communication protocol. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
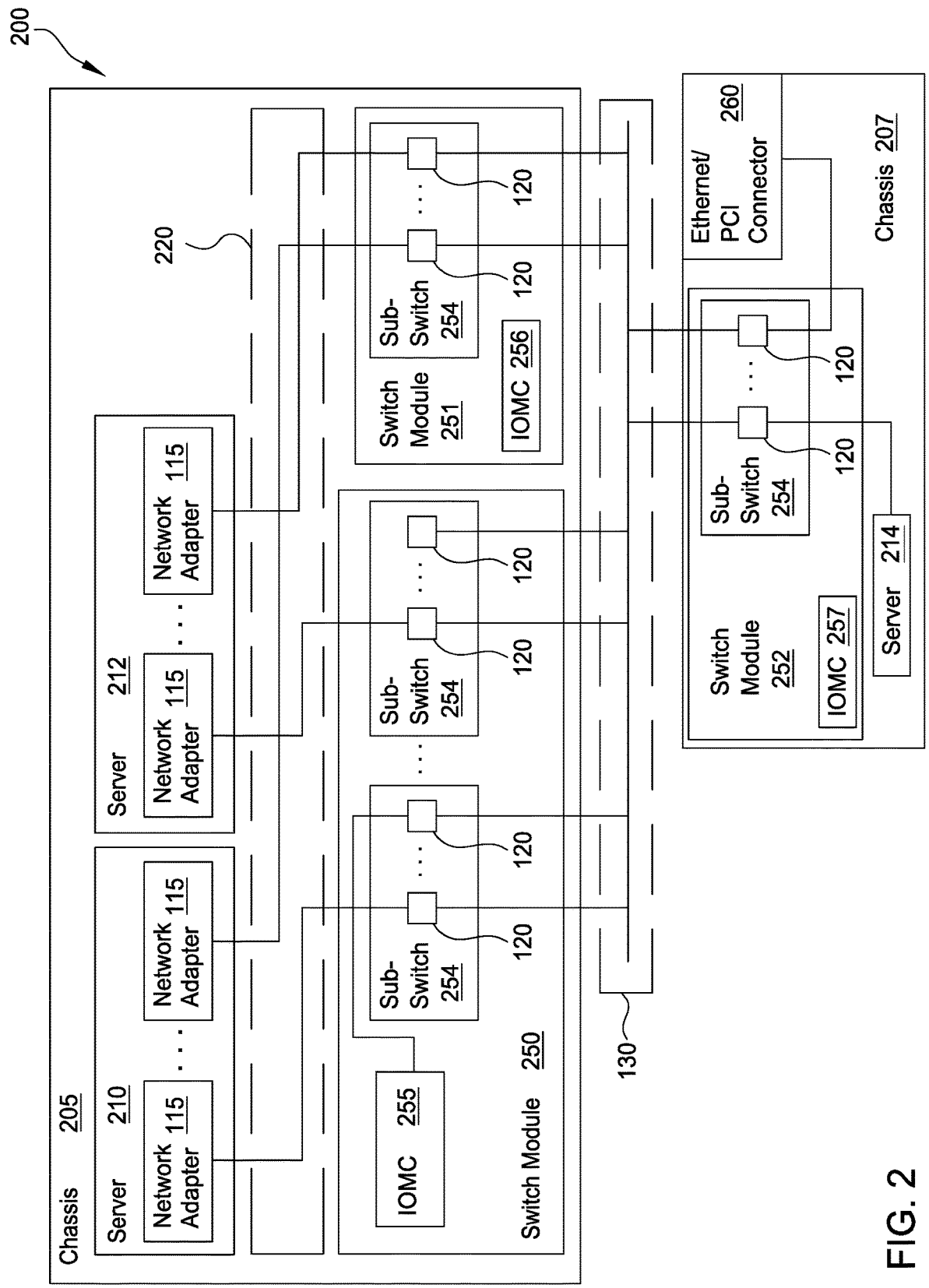
FIG. 2 illustrates the hardware representation of a system that implements a virtual switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
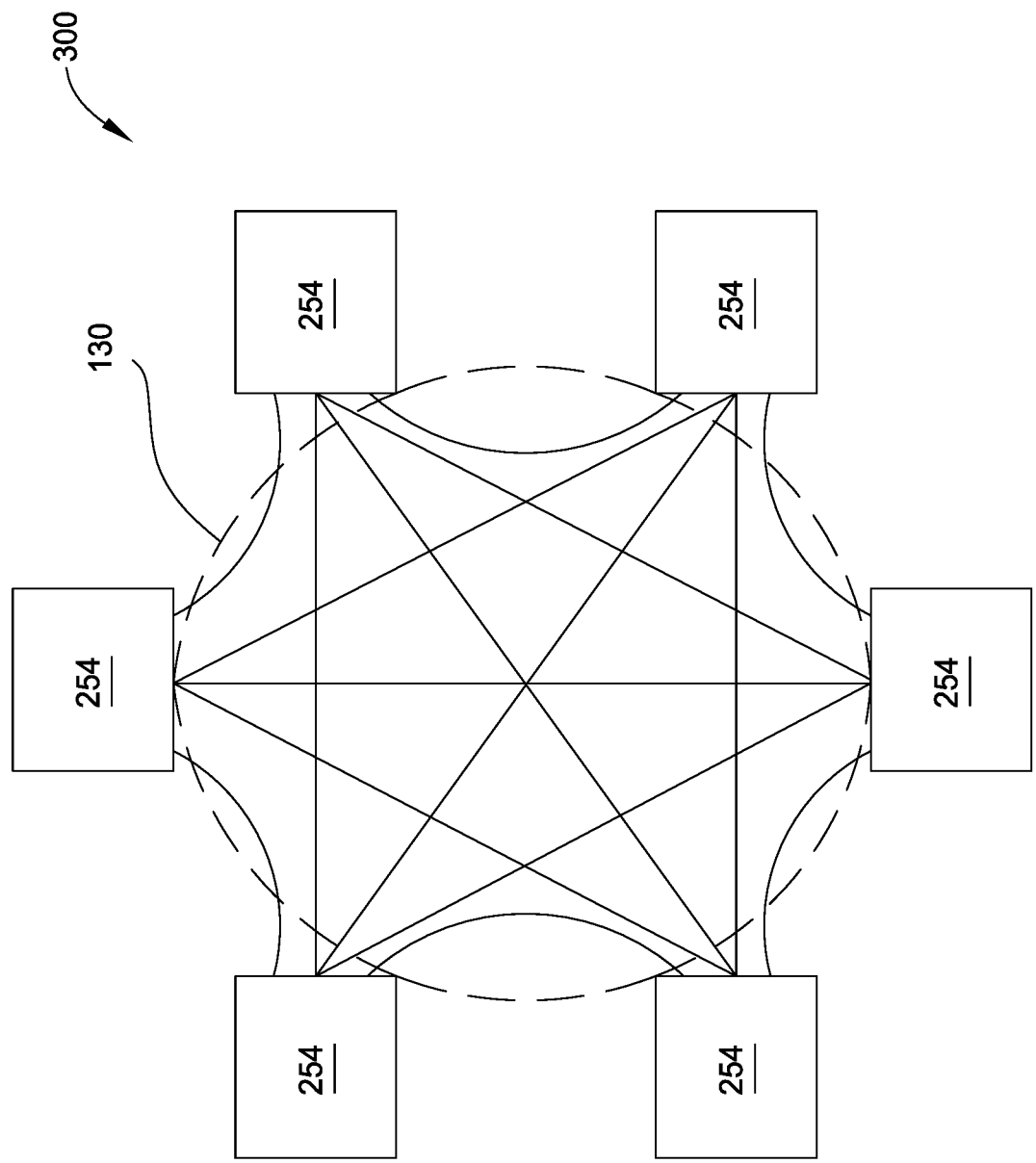
FIG. 3 illustrates a virtual switch, according to one embodiment of the invention.

FIG. 3 illustrates a virtual switching layer, according to one embodiment of the invention. Each sub-switch 254 in the systems 100 and 200 are connected to each other using the switching layer 130 and bridge elements 120 via a mesh connection schema. That is, no matter the sub-switch 254 used, a cell (i.e., data packet) can be routed to another other sub-switch 254 located on any other switch module 250, 251, 252. This may be accomplished by directly connecting each sub-switch 254—i.e., each sub-switch 254 has a dedicated data path to every other sub-switch 254. Alternatively, the switching layer 130 may use a spine-leaf architecture where each sub-switch 254 (i.e., a leaf node) is attached to at least one spine node. The spine nodes route cells received from the sub-switches 254 to the correct destination sub-switch 254. However, this invention is not limited to any particular technique for interconnecting the sub-switches 254.

A Network Fabric Implementing VLANs

Figure 4:
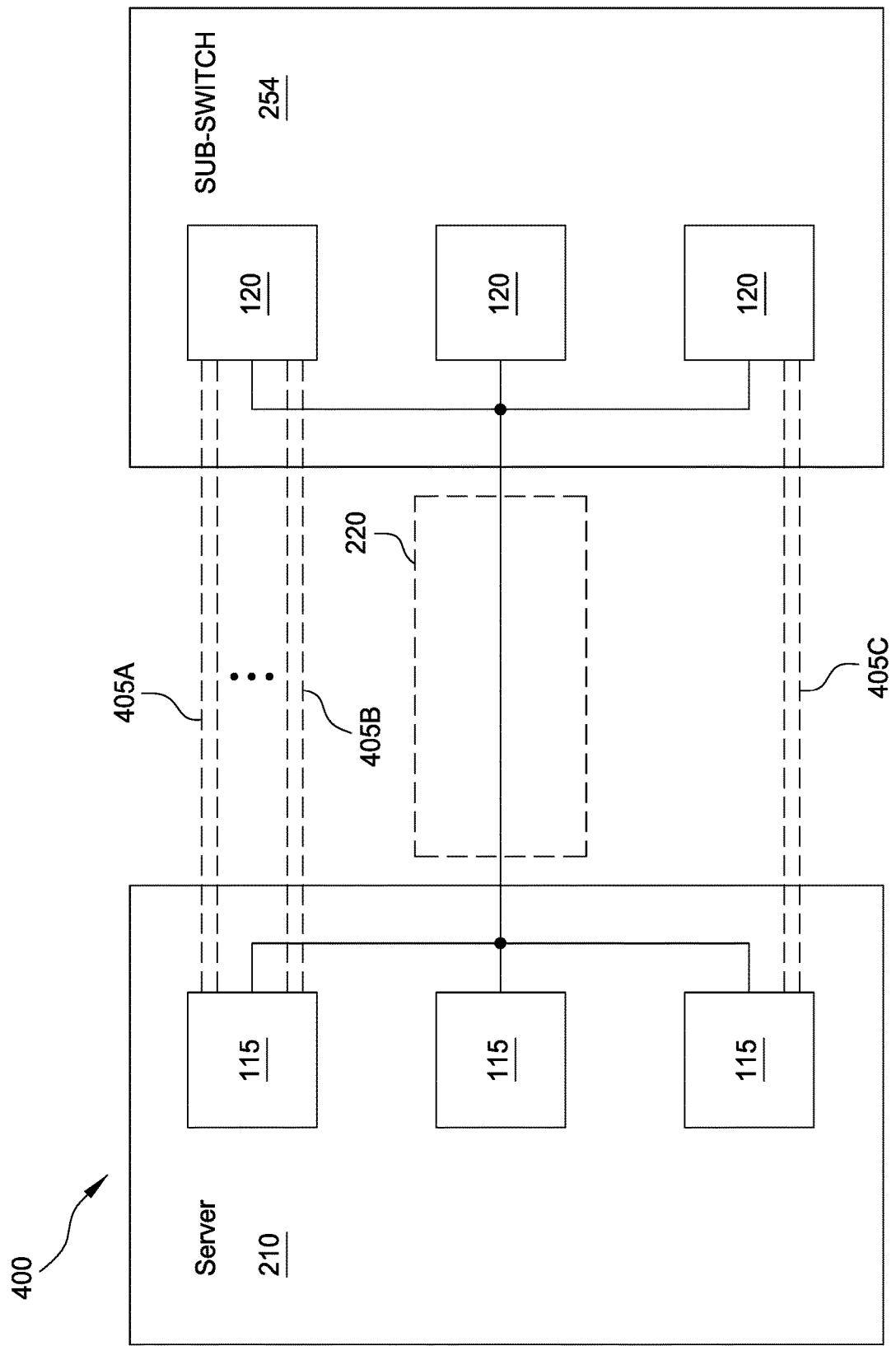
FIG. 4 illustrates using virtual local access networks in the system of FIG. 1, according to embodiments of the invention.

FIG. 4 illustrates using virtual local access networks in the system of FIG. 2, according to embodiments of the invention. Specifically, FIG. 4 simplifies FIG. 2 to include a server 210 and sub-switch 254. The network adapters 115 connect, via the midplane 220, to the bridge elements 120. However, the midplane 220 is simplified to show only one physical connection that makes up the LAN between the network adapters 115 and the bridge elements 120. In one embodiment, each network adapter 115 would have a one or more connections to a respective bridge element 120.

The dashed lines define different VLAN channels 405A-C between a network adapter 115 and a particular bridge element 120. Although a network adapter 115 may have only one or two physical Ethernet connections to a bridge element 120 (e.g., one 100 G/bit connection or two 40 G/bit connections), these connections may be logically divided into VLANs which include one or more VLAN channels for point-to-point communications. That is, each physical connection in the midplane 220 may be divided into thousands if not millions of different VLANs and their respective VLAN channels. Moreover, a VLAN channel may be an S-Channel or C-Channel for an S-VLAN or C-VLAN as defined in IEEE 802.1QinQ. Assigning packets to VLANs allows more granular control of the LAN. For example, an administrator may assign different security protocols to different VLANs or manage the packets of each VLAN differently.

In FIG. 4, each network adapter 115 may establish one or more VLAN channels to a bridge element 120 so long as the adapter 115 is physically connected to the bridge element 120 via the midplane 220. Thus, the topmost network adapter 115 may have VLAN channels to other bridge elements 120 besides the one shown. The system 400 may assign as many VLAN channels as there are uniquely addressable VLANs. For IEEE 802.1Q, this is 4096 S-VLANs. The VLAN channels may be distributed in any manner among the different physical connections of the midplane 220. Note that every physical connection according to 802.1Q may have the same VLAN channels configured (or a subset of the VLAN channels).

Figure 5:
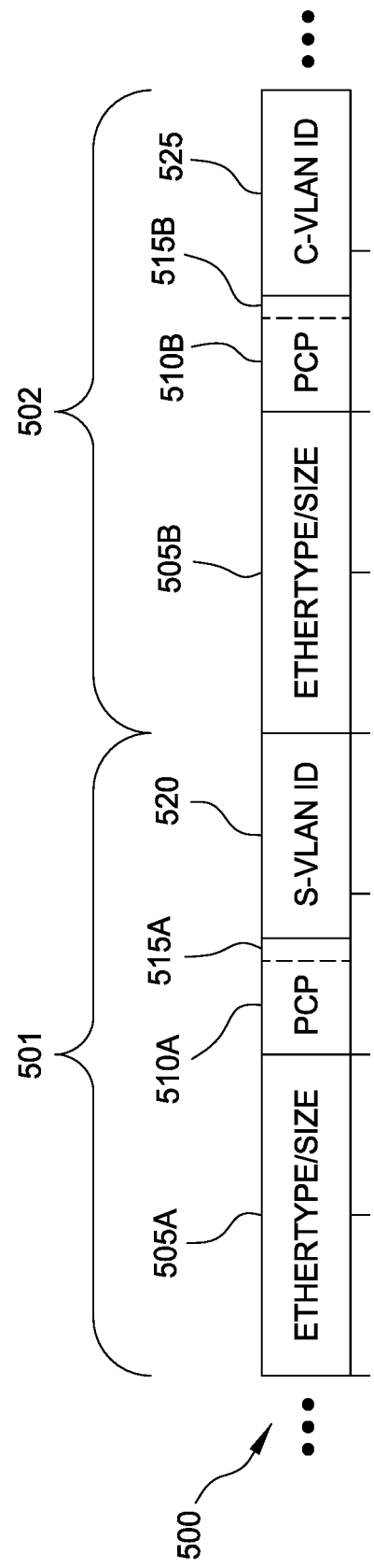
FIG. 5 is a data frame for identifying network traffic based on a virtual local area network ID, according to one embodiment of the invention.

FIG. 5 is a data frame for identifying network traffic based on VLAN ID, according to one embodiment of the invention. Specifically, data frame 500 illustrates a portion of a data frame that is compatible with IEEE 802.1QinQ. The data frame 500 is divided into two different portions: an outer tag (S-tag) 501 and an inner tag (C-tag) 502. The outer tag 501 is the same as the tag defined in IEEE 802.1Q that first introduced VLANs in CEE networks. However, to provide an administrator with greater control of the LAN, IEEE 802.1QinQ introduced the concept of double tagging by adding the inner tag 502. Thus, the embodiments disclosed herein may be used to address VLANs that are established based on IEEE 802.1Q or 802.1QinQ.

The tags 501, 502 include the EtherType/size 505, a priority code point (PCP) 510, a canonical format indicator (CFI) 515, and an S-VLAN ID 520 or a C-VLAN ID 525. The EtherType 505 is typically a 16-bit (or two byte) field used to indicate which protocol is encapsulated in the payload of the data packet. The PCP 510 is a three-bit field that refers to the priority or traffic class (i.e., priority 1-priority 8) assigned to the S-VLAN or C-VLAN, respectively. The CFI 515 is a 1-bit field that indicates whether a MAC address (stored elsewhere in the data frame 500) is in a non-canonical format.

For IEEE 802.1Q and 802.1QinQ, the S-VLAN ID 520 is 12 bits and specifies the S-VLAN to which the frame 500 belongs. The C-VLAN ID, which is not defined in IEEE 802.1Q standard, is also 12 bits long and specifies the C-VLAN to which the frame 500 belongs. That is, IEEE 802.1QinQ expanded IEEE 802.1Q such that each S-VLAN can have up to 4096 uniquely addressable C-VLANs, thereby providing over 16 million addressable VLANs. A data frame defined only by IEEE 802.1Q, however, would include portions 505A, 510A, 515A, and 520 but would not include portions 505B, 510B, 515B, and 525. In either case, the embodiments disclosed herein are not limited to IEEE 802.1Q and 802.1QinQ but may be used in any related or derivation of these standards (e.g., IEEE 802.1Qat or IEEE 802.1ak) or any other standards that are presently or may at a future time be compatible with generating VLANs.

In general, the data frame 500 is a portion of a larger data frame (i.e., a data packet) that is transmitted from a source to a destination across a network. The entire data frame would include other partitions that include, for example, a preamble, source and destination addresses, a payload, error correction code, and the like.

Allocating Bandwidth within VLAN Channels

Figure 6:
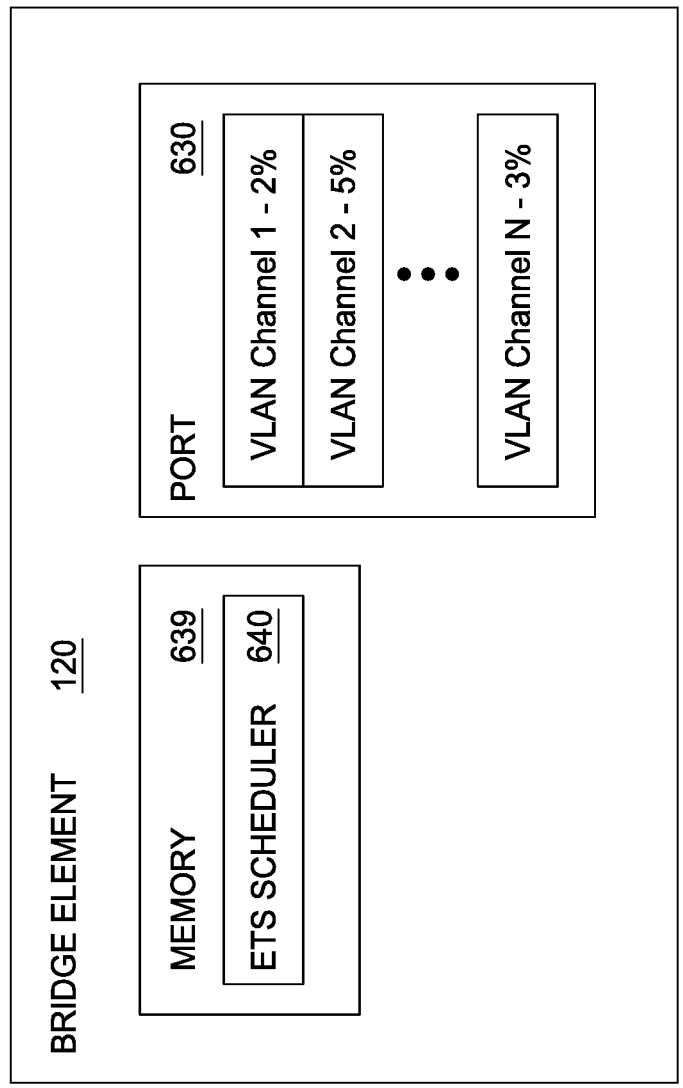
FIG. 6 illustrate using an enhanced version of Enhanced Transmission Selection in the system of FIG. 1, according to embodiments of the invention.

FIG. 6 illustrates an enhanced version of ETS that uses VLANs in the system of FIG. 1, according to one embodiment of the invention. FIG. 6 illustrates a bridge element 120, memory 639, and port 630. The memory 639 may represent random access memory (RAM) devices cache memories, non-volatile or backup memories (e.g., programmable or flash memories), read-only memories, and the like. The memory 639 includes an ETS scheduler 640 that divides the bandwidth associated with a physical connection between two compute devices—e.g., between two bridge elements 120. In one embodiment, the ETS scheduler 640 is configured to comply with IEEE 802.1Qaz.

The port 630 is used by the bridge element 120 to establish a connection to a compute device. For example, the port 630 may be a physical connector to which an Ethernet cable is attached. As shown, the port 630 may be logically divided to represent the bandwidth allocations to VLAN channels that use the physical connection. For example, the ETS scheduler 640 may be configured to allocate bandwidth according to the number of VLAN channels or VLANs in the fabric. Each VLAN channel may be guaranteed a certain percentage of the bandwidth available to port 630. If one of the VLAN channels is not currently using its allocated bandwidth, the ETS scheduler 640 may temporarily allow network traffic associated with a different VLAN channel to use its bandwidth.

Further, the bandwidth allocation may be assigned to a block or group of VLAN channels. That is, VLAN channels 1-3 may be assigned 2% of the port's bandwidth. Moreover, in one embodiment the ETS scheduler 640 may allocate bandwidth to a subset of the VLAN channels that use the port 630. Accordingly, not every VLAN channel that uses port 630 must be allocated or guaranteed bandwidth by the ETS scheduler 640.

In one embodiment, the ETS scheduler 640 may be located in memory elsewhere in the virtual switch 180.

Figure 7:
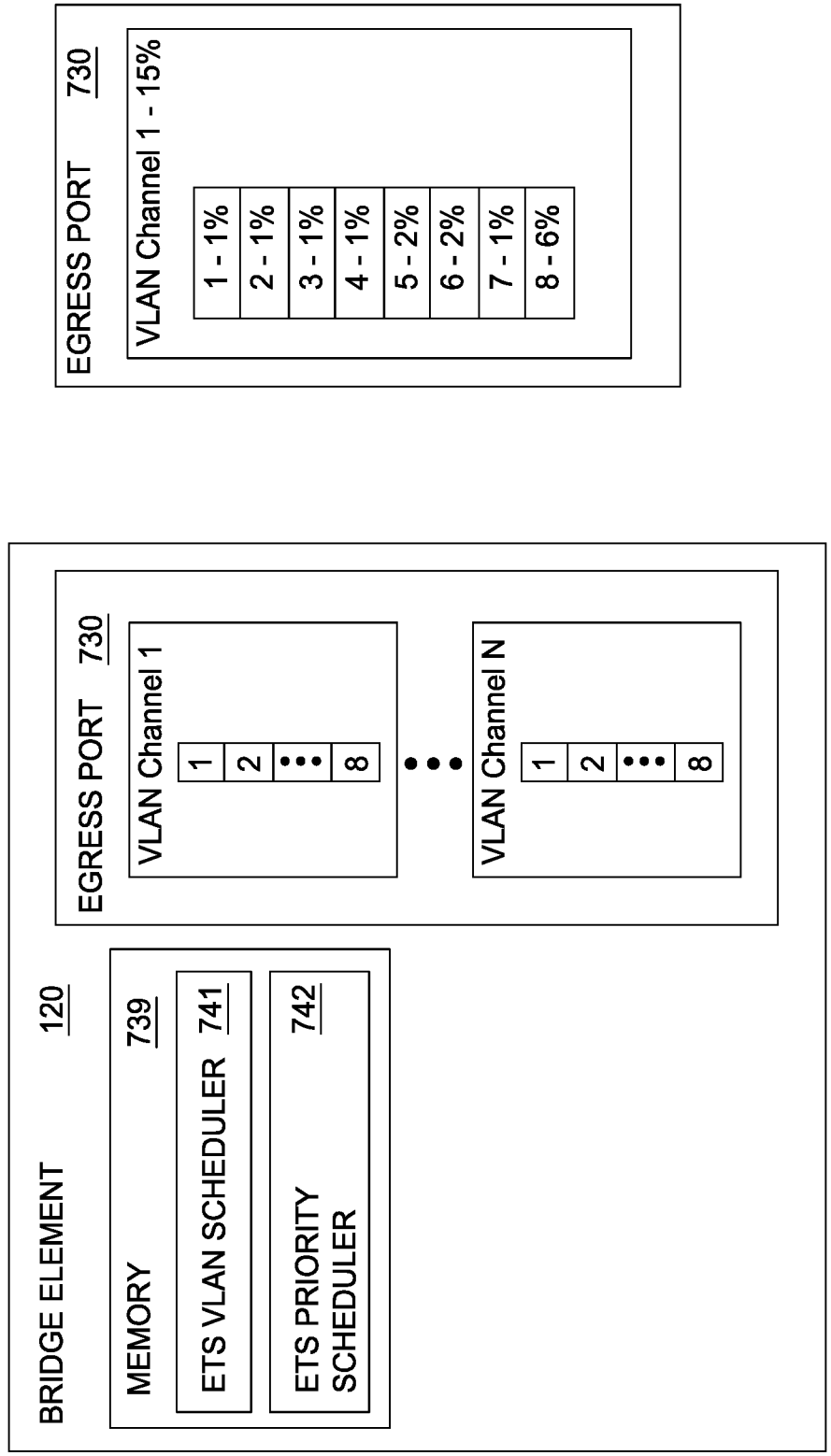
FIGS. 7A-7B illustrate an enhanced version of Enhanced Transmission Selection that uses virtual local area networks, according to one embodiment of the invention.

FIGS. 7A-7B illustrate a ETS scheduler hierarchy, according to one embodiment of the invention. Instead of relying solely on allocating bandwidth to a single VLAN channel or a group of VLAN channels, an ETS scheduler may also allocate bandwidth to traffic classes within the VLAN. As shown by the data frame 500 in FIG. 5, each frame assigned to a VLAN may also be assigned to a specific traffic class within the VLAN (i.e., the value represented by PCP 510). Each data frame may be assigned to a VLAN based on its VLAN ID (i.e., S-VLAN ID 520 and/or C-VLAN ID 525) as well as a specific traffic class.

The memory 739 may include an ETS scheduler hierarchy made up of ETS VLAN scheduler 741 and ETS priority scheduler 742. The ETS VLAN scheduler 741 may perform a similar function as the ETS scheduler 640 of FIG. 6. That is, the ETS VLAN scheduler 741 may allocate bandwidth to one or more VLAN channels that use the egress port 730. In addition to allocating bandwidth amongst VLAN channels, the ETS priority scheduler 742 of the ETS scheduler hierarchy may further divide the bandwidth amongst the traffic classes. That is, the ETS priority scheduler 742 may subdivide the bandwidth allocated to a specific VLAN channel amongst the different traffic classes in the VLAN channel (i.e., priorities 1-8).

FIG. 7B illustrates an example for allocating bandwidth assigned to an VLAN channel or VLAN based on traffic classes. As shown, the ETS VLAN scheduler 741 allocated 15% of the bandwidth associated with the port 730 to the network traffic assigned to VLAN channel 1. In addition, the ETS priority scheduler 742 divided further the 15% allocation between the different traffic classes (i.e., priority 1-8). As a result, priority 8 receives 6% of the total bandwidth of port 730 while priority 1 receives only 1% of the total bandwidth. Accordingly, the network traffic assigned to priority 8 of VLAN channel 1 is guaranteed at least 6% of the port's bandwidth while priority 1 is guaranteed 1%. In this manner, the bandwidth for port 730 may be divided into any desired allocation.

Moreover, the ETS scheduler hierarchy may be used to allocate bandwidth when multiple VLAN channels are grouped together. For example, if the ETS VLAN scheduler 741 allocates 15% of the port's bandwidth to VLAN channels 1-3, the ETS priority scheduler 742 may allocate a portion of that bandwidth to each of the traffic classes associated with the VLAN channels. For example, priority 1 of VLAN channel 1 and priority 5 of VLAN channel 2 may receive all of the bandwidth while the other priorities are not allocated bandwidth. Alternatively, the ETS priority scheduler 742 may treat each traffic class of the respective VLAN channels the same. In that case, the bandwidth allocation would be similar to the one shown in FIG. 7B except that the allocation applies to multiple VLAN channels. That is, priority 1 for each of the VLAN channels would be allocated, as a group, 1% of the total bandwidth, priority 5 for each of the VLAN channels would be allocated a total of 2%, etc. until the 15% allocation to the multiple VLAN channels has been distributed. However, similar to VLANs, not all of the traffic classes within a VLAN channel must be allocated bandwidth even if the VLAN itself is allocated bandwidth.

Although shown as separate components, in one embodiment the ETS VLAN scheduler 741 and ETS priority scheduler 742 may be integrated into a single component.

Figure 8:
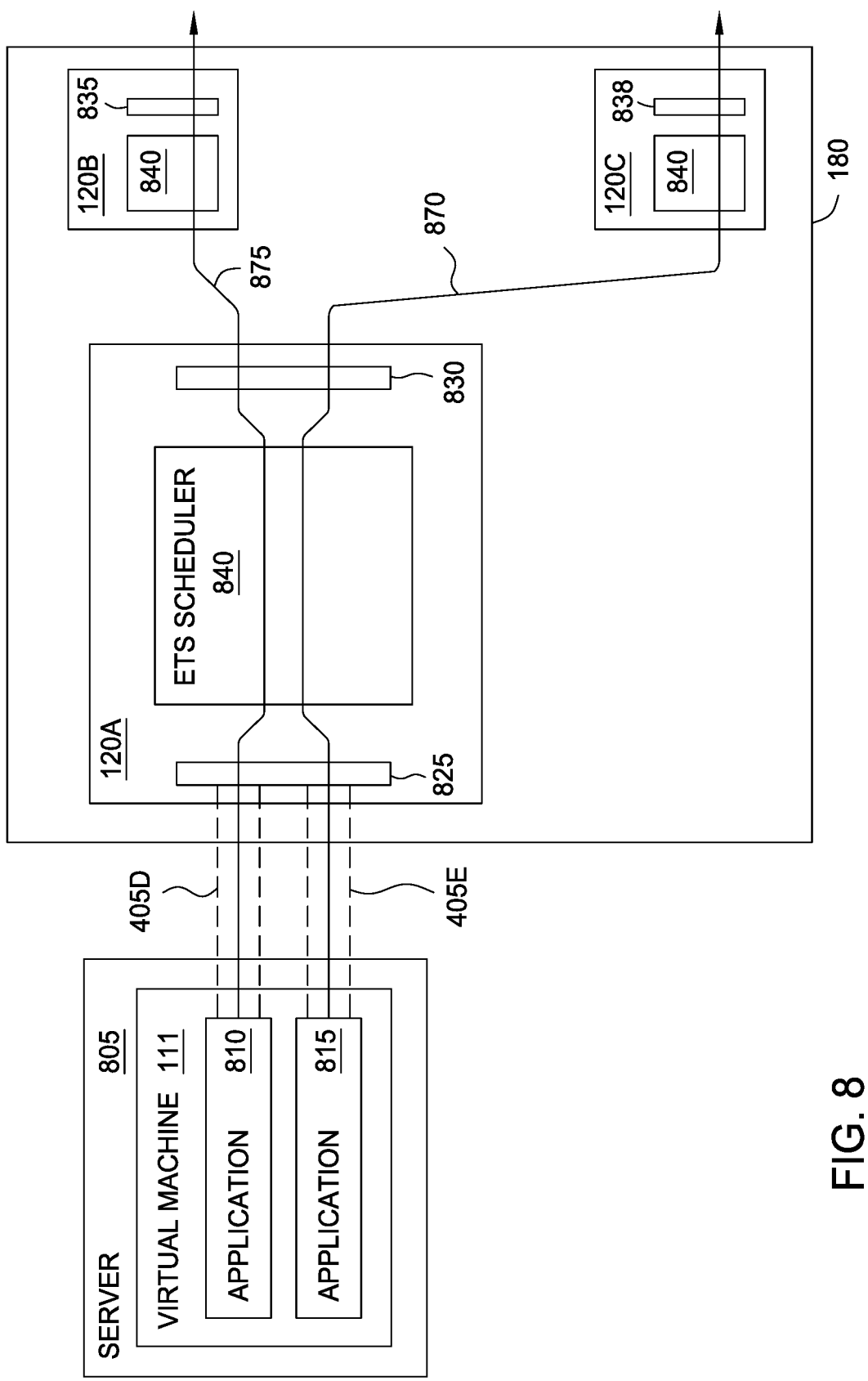
FIG. 8 illustrates an enhanced version of Enhanced Transmission Selection that uses virtual local area networks in the system of FIG. 2, according to one embodiment of the invention.

FIG. 8 is a simplified representation of the system illustrated in FIG. 2. FIG. 8 illustrates connections between a server and a network device (i.e., bridge element 120), between network devices, between network devices and other WANs or LANs, and connections between network devices and other compute devices.

As shown, FIG. 8 includes a server 805 with a virtual machine 111 that may have two different applications 810, 815 executing. The applications 810, 815 are each associated with a separate VLAN, or more specifically, an S-Channel, that routes data packets from the applications 810, 815 to at least one bridge element 120 in the virtual switch 180. For clarity, the physical connection between the server 805 and the bridge element 120 is omitted. Furthermore, the VLAN channels 405D and 405E may be associated with the same connection or different physical connections.

The virtual switch 180 includes a plurality of bridge elements 120A-C that include ingress port 825, egress ports 830, 835, and 838, and ETS schedulers 840. Although not shown, the server 805 may also include an ETS scheduler and an egress port that is logically divided to allocate bandwidth based on the VLANs in the network.

The bridge element 120A receives data packets (i.e., data frames) from the two applications 810, 815 that are assigned to respective VLAN channels. Using a queue, the bridge element 120A may use the mesh network in the virtual switch 180 to forward the packets via the egress port 830 to a different network device in the virtual switch 180. The data path 870 associated with application 815 transfers data frames assigned to VLAN channel 405E. The ETS scheduler 840 of bridge element 120A may allocate bandwidth to this network traffic as well as data traffic that flows across VLAN channels 405D and 405E in a direction towards the server 805.

After the ETS scheduler 840 establishes the bandwidth allocation for port 830, as the bridge element 120A receives data frames it evaluates the VLAN ID to determine to which VLAN it belongs. When then forwarding the packet, the bridge element 120A knows how much bandwidth is available for that VLAN. For example, if the ETS scheduler 840 allocated 4% of the bandwidth to the VLAN, then all the data frames with the corresponding VLAN ID are guaranteed at least that much bandwidth when being forwarded across the corresponding VLAN channel.

If the ETS scheduler 840 contains an ETS scheduler hierarchy, the scheduler 840 may further divide the allocated bandwidth based on the traffic classes within the VLAN that contains VLAN channel 405E. The ETS scheduler 840 may perform the same process for VLAN channel 405D for application 810 (i.e., data path 875). Here, both the priority code and the VLAN ID in a received data frame are used to ensure that the correct amount of bandwidth is used when forwarding the packet. In this manner, the ETS scheduler 840 may guarantee that the VLANs and traffic classes of data paths 870 and 875 have available a minimum percentage of the port's 830 bandwidth.

However, the ETS schedulers 840 for bridge elements 120B and 120C may assign different percentages of bandwidth to the data paths 870 and 875. That is, the bandwidth allocation given to the network traffic of data path 870 that flows through bridge element 120A may be, for example, either greater than or less than the bandwidth allocation given to the network traffic of data path 870 that flows through bridge element 120C. Alternatively, the ETS scheduler 840 in bridge element 120C may not allocate or guarantee bandwidth to data frames of data path 870. Generally, a system administrator may configure the ETS scheduler 840 of the bridge elements 120A-C to meet the needs of the particular bridge element 120. For example, bridge elements 120B may forward data traffic to a different WAN while bridge element 120C may forward data traffic to a compute device such as another server or storage device connected to the virtual switch 180. These different configurations may cause the administrator to assign bandwidth differently for different bridge elements 120.

ETS as defined in IEEE 802.1Qaz does not provide a way to allocate the bandwidth of a physical connection with any granularity greater than that of the traffic classes. As mentioned previously, IEEE 802.1Q allows a network administrator to establish up to 4096 different VLANs while IEEE 802.1QinQ provides over 16 million VLANs. Being able to allocate bandwidth based on a VLAN rather than a traffic class may increase the network administrator's ability to control how bandwidth is allocated. The ETS scheduler 840 disclosed herein may allocate different portions of bandwidth to application 810 (i.e., VLAN channel 405D) and application 815 (i.e., VLAN channel 405E). Instead of having to assign the VLAN channels 405D,E to different traffic classes in order to allocate bandwidth differently between the applications, the ETS scheduler 840 may be configured to allocate bandwidth to received data frames based on their membership in a particular VLAN.

The egress ports 830, 835, 838 may be divided into thousands or millions of different allocations based on VLAN IDs (e.g., S-VLANS or C-VLANs). Currently, ETS provides bandwidth allocation in increments of 1% (i.e., a maximum of 100 VLANs could be allocated 1% of bandwidth); however, the embodiments disclosed herein may be used with future bandwidth allocation schemas that may allocate bandwidth with much greater precision. Future schemas may permit the ETS scheduler 840 to divide the bandwidth of the physical connection into any different combination amongst the 16 million different VLANs currently possible using IEEE 802.1QinQ. This number can be expanded further if an ETS scheduler hierarchy is used which subdivides bandwidth allocated to VLANs based on the eight traffic classes.

CONCLUSION

IEEE 802.1Q and ETS provide only eight different traffic classes that may be used to control bandwidth in a particular physical connection (or link). Instead of relying only on these eight traffic classes to manage bandwidth, the embodiments discussed herein disclose using an enhanced ETS scheduler that permits a network device to set the bandwidth for an individual VLAN. Allocating bandwidth in a port based on a VLAN ID permits a network device to allocate bandwidth to millions of unique VLANs. Thus, this technique may increase the granular control of the network fabric and its performance.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
providing a physical connection that connects two computing devices, wherein network traffic flowing through the physical connection is logically divided into a plurality of virtual local area networks (VLAN) channels; and
allocating a bandwidth of the physical connection amongst at least two of the plurality of VLAN channels based on the network traffic flowing through the physical connection.

2. The method of claim 1, further comprising:
subdividing the bandwidth allocated to one of the plurality of VLAN channels amongst a plurality of traffic classes, wherein the plurality of VLAN channels and the plurality of traffic classes are configured based on at least one of: IEEE 802.1Q and a derivative of IEEE 802.1Q.

3. The method of claim 1, further comprising:
determining whether the network traffic assigned to the one of the plurality of VLAN channels is using the allocated bandwidth,
if not, allocating at least a portion of the bandwidth assigned to the one of the plurality of VLAN channels to a different VLAN channel; and
reallocating the portion of the bandwidth from the different VLAN channel to the one of the plurality of VLAN channels.

4. The method of claim 1, wherein the VLAN channel is associated with a service VLAN (S-VLAN).

5. The method of claim 1, wherein the VLAN channel is associated with a customer VLAN (C-VLAN) that is assigned to an S-VLAN.

6. The method of claim 5, wherein the S-VLAN and C-VLAN are configured based on at least one of: IEEE 802.1QinQ and a derivative of IEEE 802.1QinQ.

7. The method of claim 1, wherein only a subset of the plurality of VLAN channels of the physical connection are allocated bandwidth.

8. The method of claim 1, wherein the bandwidth of the physical connection corresponds to a bandwidth of a port of one of the two computing devices, and wherein the at least two of the plurality of VLAN channels is assigned different portions of the bandwidth of the port.

9. A non-transitory computer program product comprising:
a computer-readable storage medium having computer-readable program code embodied therewith, the computer-readable program code comprising computer-readable program code configured to:
establish a physical connection that connects two computing devices, wherein network traffic flowing through the physical connection is logically divided into a plurality of virtual local area networks (VLAN) channels; and
allocate a bandwidth of the physical connection amongst at least two of the plurality of VLAN channels based on the network traffic flowing through the physical connection.

10. The non-transitory computer program product of claim 9, wherein the computer-readable program code is configured to:

subdivide the bandwidth allocated to one of the plurality of VLAN channels amongst a plurality of traffic classes, wherein the plurality of VLAN channels and the plurality of traffic classes are configured based on at least one of: IEEE 802.1Q and a derivative of IEEE 802.1Q.

11. The non-transitory computer program product of claim 9, further comprising computer-readable program code configured to:
   determine whether the network traffic assigned to the one of the plurality of VLAN channels is using the allocated bandwidth,
   if not, allocate at least a portion of the bandwidth assigned to the one of the plurality of VLAN channels to a different VLAN channel; and
   reallocate the portion of the bandwidth from the different VLAN channel to the one of the plurality of VLAN channels.

12. The non-transitory computer program product of claim 9, wherein the VLAN channel is associated with a service VLAN (S-VLAN).

13. The non-transitory computer program product of claim 9, wherein the VLAN channel is associated with a customer VLAN (C-VLAN) that is assigned to an S-VLAN.

14. The non-transitory computer program product of claim 13, wherein the S-VLAN and C-VLAN are configured based on at least one of: IEEE 802.1QinQ and a derivative of IEEE 802.1QinQ.

15. The non-transitory computer program product of claim 9, wherein only a subset of the plurality of VLAN channels of the physical connection are allocated bandwidth.

16. A network device, comprising:
   a port configured to be connected via a physical connection to a computing device, wherein network traffic flowing through the physical connection is logically divided into a plurality of virtual local area networks (VLAN) channels; and
   a bandwidth scheduler configured to allocate a bandwidth of the port amongst at least two of the plurality of VLAN channels based on the network traffic flowing through the physical connection.

17. The device of claim 16, wherein the bandwidth scheduler is configured subdivide the bandwidth allocated to one of the plurality of VLAN channels amongst a plurality of traffic classes, wherein the plurality of VLAN channels and the plurality of traffic classes are configured based on at least one of: IEEE 802.1Q and a derivative of IEEE 802.1Q.

18. The device of claim 16, wherein the bandwidth scheduler is configured to:
   determine whether the network traffic assigned to the one of the plurality of VLAN channels is using the allocated bandwidth,
   if not, allocate at least a portion of the bandwidth assigned to the one of the plurality of VLAN channels to a different VLAN channel; and
   reallocate the portion of the bandwidth from the different VLAN channel to the one of the plurality of VLAN channels.

19. The device of claim 16, wherein the VLAN channel is associated with a service VLAN (S-VLAN).

20. The device of claim 16, wherein the VLAN channel is associated with a customer VLAN (C-VLAN) that is assigned to an S-VLAN.

21. The device of claim 16, wherein only a subset of the plurality of VLAN channels of the physical connection are allocated bandwidth.

* * * * *